T. C. WESSELS & W. KANE.
GATE.
APPLICATION FILED JULY 14, 1916.
1,225,197.
Patented May 8, 1917.
2 SHEETS—SHEET 1.
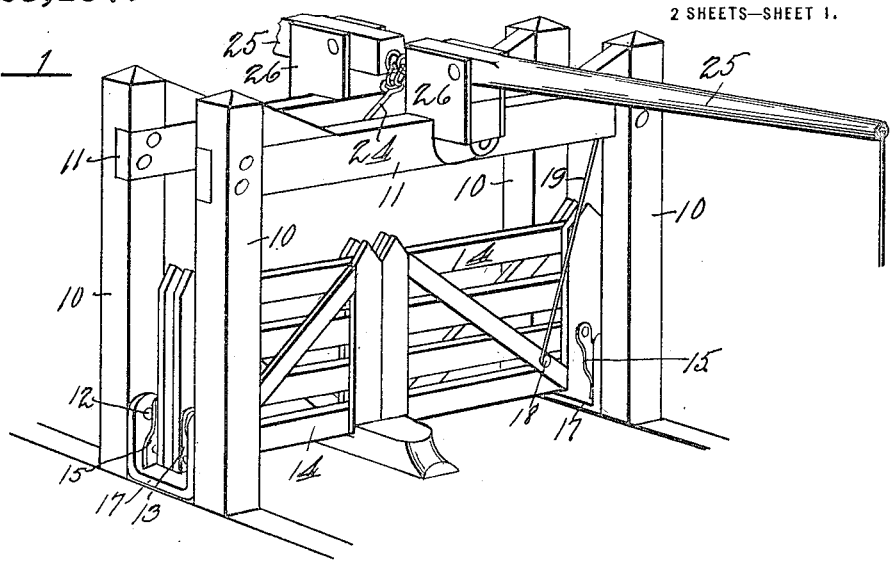
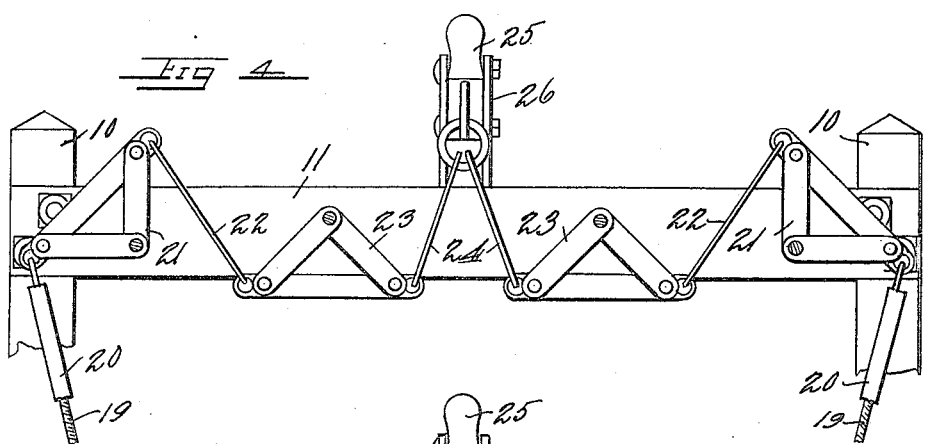
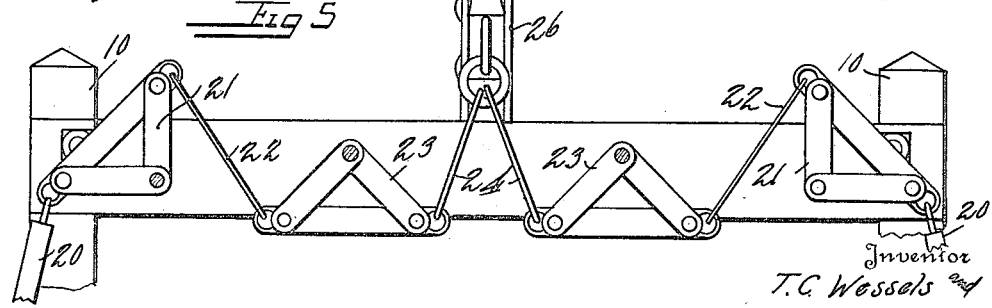

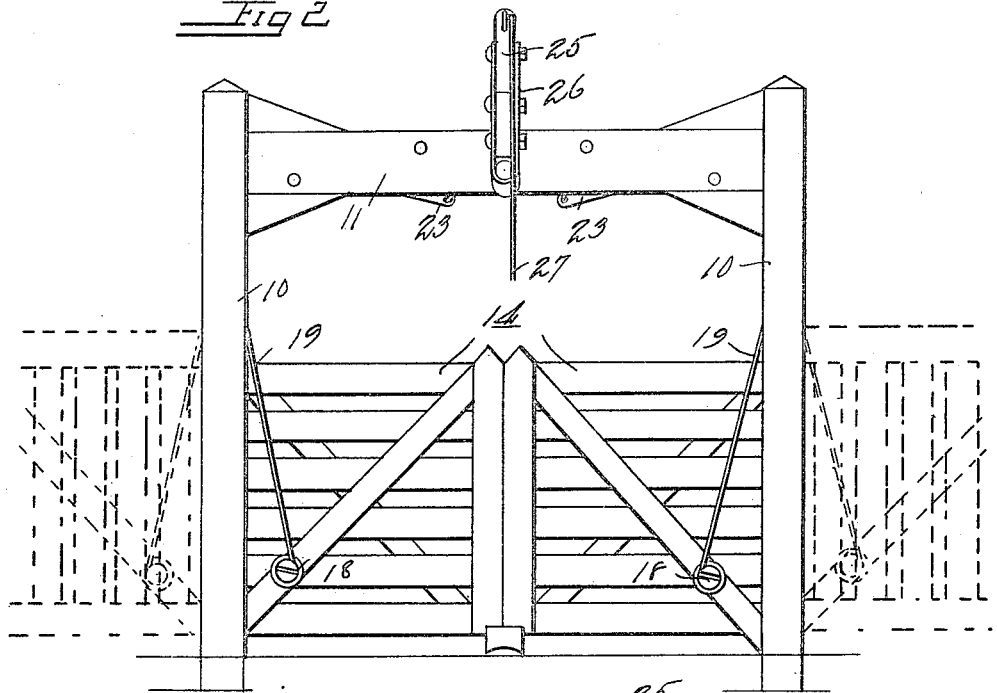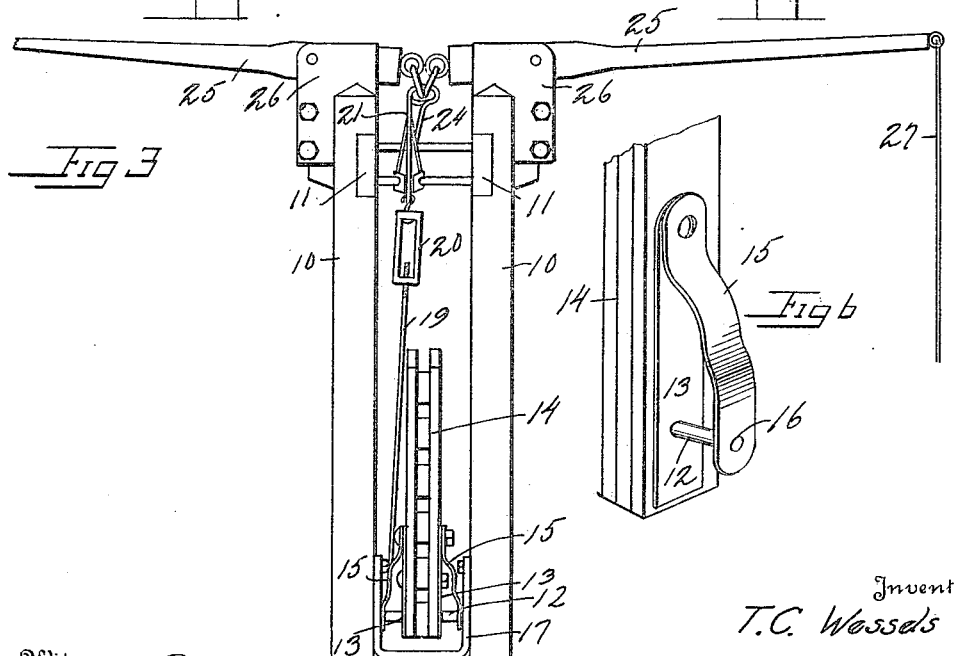

UNITED STATES PATENT OFFICE.

THOMAS C. WESSELS AND WILLIAM KANE, OF LYTTON, BRITISH COLUMBIA, CANADA.

GATE.

1,225,197.  Specification of Letters Patent.  Patented May 8, 1917.

Application filed July 14, 1916. Serial No. 109,363.

*To all whom it may concern:*

Be it known that we, THOMAS C. WESSELS and WILLIAM KANE, subjects of the King of Great Britain, residing at Lytton, in the Province of British Columbia, Dominion of Canada, have invented certain new and useful Improvements in Gates; and we do hereby declare the following to be a full, clear, and exact description of the invention, such as will enable others skilled in the art to which it appertains to make and use the same.

This invention relates to gates, and has special reference to that type of gates which is used at the entrance to farms and between fields in farms, wherein it is convenient for the driver to operate the gate and open and close the same without descending from the vehicle or horse.

The principal object of the invention is to provide an improved and simplified mechanism for operating gates of this character and at the same time to provide an improved means for pivoting such gates.

With the above and other objects in view, as will be hereinafter apparent the invention consists in general of certain novel details of construction and combinations of parts hereinafter fully described, illustrated in the accompanying drawings, and specifically claimed.

In the accompanying drawing, like characters of reference indicate like parts in the several views, and:—

Figure 1 is a perspective view of the gate in closed position;

Fig. 2 is a front elevation of the gate;

Fig. 3 is a side elevation of the gate, the movable members being shown in closed position;

Fig. 4 is a detail view of the upper part of the gate in elevation, the frame-work being broken away to show the parts and the latter being in the position assumed when the gate is closed;

Fig. 5 is a view similar to Fig. 4 but showing the parts assumed when the gate is open;

Fig. 6 is a perspective view of the pivoted corner of one of the gate members showing the springs thereon.

In the form of the device herein illustrated, there has been shown a double gate, that is to say, a gate which consists of two leaves and opens in the middle. It will be obvious, however, that one of these leaves may be omitted with its connecting parts and this will be done when desired as, for instance, when the road is narrow.

In the present disclosure there is provided a frame-work which consists of two pairs of spaced uprights 10 arranged opposite each other on opposite sides of the road and connected above by the cross beams 11.

Referring now to one gate member and its connecting parts, the other being identical, it will be seen that there is provided between the pair of uprights on one side of the road a pivot bar 12 which is located adjacent the lower ends of these uprights and connecting the same. On the lower outer corner of the gate, and on each side thereof is provided a reinforcing plate 13 and through this lower corner and the reinforcing plate 13 extends a suitable opening for the reception of the pivot bar 12. The gate structure, illustrated at 14, is of the usual post and slat type with a pair of diagonal braces. Springs 15 have their upper ends fixed to the gate adjacent the pivot bar the springs preferably being fixed to the wear plates and these springs have their free ends bearing against the inner faces of the uprights 10. The free ends of these springs are provided with openings 16 wherethrough pass the pivot bar 12. Thus these springs press against the uprights at their lower ends and in order to prevent wear at these points the wear plates 17 are provided.

Fixed to the gate in spaced relation to the gate pivot or pivot bar and located between such pivot bar and the center of gravity of the gate is a pivot pin 18 to which is connected the lower end of a link 19 which extends upwardly and includes a turn buckle 20 constituting length adjusting means. To the cross bar 11 is pivoted a bell crank lever 21, the angle of the lever being the fulcrum and one of the arms of this lever is connected to the upper end of the link 19, To the remaining arm of the lever is connected a link 22, and it is to be noted that the arms of this lever are directed upward.

A second bell crank lever 23 is pivoted to the frame at its angle and has one arm connected to the link 22 while to the other arm is connected a third link 24 which extends upward and is connected to the short arm of an operating lever 25 which is fulcrumed to a bracket 26 mounted on the cross bar 11. The remaining arm of the lever 25 is so positioned as to extend adjacent the path of a person riding a horse or driving a wagon and maybe provided with a pull wire or cord 27.

As before noted, the opposite gate is connected in the same manner to the lever and in order to operate the device from both sides of the gate, the lever 25 is provided in duplicate, one long arm extending from one side of the frame while the other long arm extends in the opposite direction.

In operating the device, the long arm of the operating lever is pulled downward quickly and this causes the pivot pin 18 to move upward. Thus the center of gravity reaches a point vertically above the pivot of the gate the momentum derived from the quick impulse given by pulling down on the operating lever will throw the gate into open position. In like manner, when closing the gate the momentum will similarly throw the gate over into closed position.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

The combination with a frame having a pair of spaced uprights; a pivot bar connecting said uprights, a gate pivoted on the bar, springs fixed to each side of the gate and having their free ends bearing against the adjacent faces of the uprights, said springs having openings wherethrough said bar passes, a pivot pin carried by the gate and spaced from the gate pivot toward the center of gravity of the gate, a link having its lower end connected to the pivot pin and including length adjusting means, a bell crank lever pivoted at its angle to the frame and having one of its arms connected to the link, a link connected to the second arm of said lever, a second bell crank lever pivoted to the frame at its angle and having one arm connected to the second link, a third link connected to the remaining arm of the second lever, and an operating lever fulcrumed to the frame and having a short arm connected to the third link, the remaining arm of said lever extending adjacent the path of the operator.

In testimony whereof, we affix our signatures in the presence of two witnesses.

THOMAS C. WESSELS.
WILLIAM KANE.

Witnesses:
ALPHONSE F. HUNTER,
JOHN A. MCINTOSH.

Copies of this patent may be obtained for five cents each, by addressing the "Commissioner of Patents, Washington, D. C."